United States Patent

Breetvelt

[11] 3,727,500
[45] Apr. 17, 1973

[54] RELATING TO CLAMPING MEANS

[75] Inventor: Emile Breetvelt, Johannesburg, Republic of South Africa

[73] Assignee: Intermenua (Proprietary) Ltd., Johannesburg, Transvaal, Republic of South Africa

[22] Filed: Feb. 17, 1971

[21] Appl. No.: 116,025

[30] Foreign Application Priority Data

Feb. 25, 1970 South Africa .......................70/1251

[52] U.S. Cl. .........................83/375, 83/453, 269/32
[51] Int. Cl. ................................................B26d 5/42
[58] Field of Search....................83/375, 451, 452, 83/453, 461, 465, 390, 454; 269/31, 32, 216, 217, 231

[56] References Cited

UNITED STATES PATENTS 3,026,755  3/1962  Castle, Jr............................83/390 X
2,896,515  7/1959  Alexander..........................269/32 X Primary Examiner—Andrew R. Juhasz
Assistant Examiner—W. Donald Bray
Attorney—Stevens, Davis, Miller & Mosher

[57] ABSTRACT

The invention relates to a shearing machine for the cutting of metal sheet and other sections and in particular to an hydraulic system of clamps used to locate the sheet being cut and in which the loads applied to the clamps is transferred from the hydraulic system to a mechanical linkage better able to resist these forces.

5 Claims, 1 Drawing Figure

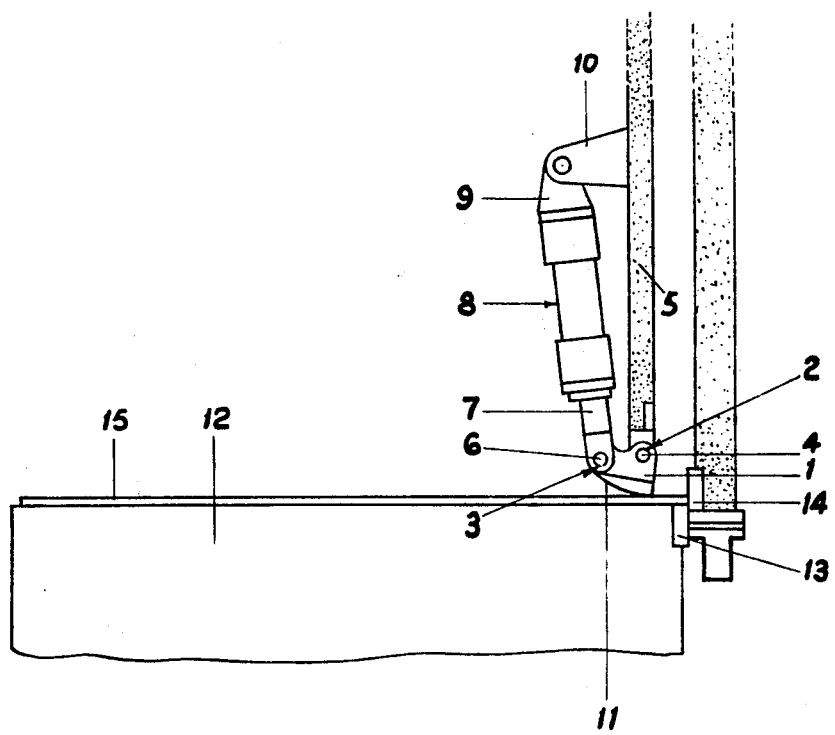

RELATING TO CLAMPING MEANS

The present invention relates to a clamping device particularly for use with guillotines, shears and like machines employed in severing metal plates, sections and the like. For reasons of convenience, such machines will be referred to in the present specification as "shearing machines."

Various arrangements have been proposed for retaining steel plates or the like in position on shearing machines during cutting or shearing operations. One arrangement comprises one or more hydraulic rams mounted to the machine chassis and positioned to bear down on the plate so that the plate is held firmly in position against a supporting table forming part of the shearing machine. This arrangement suffers from the disadvantage that as the load is taken up by the ram, during cutting or shearing operations, the ram tends to "give" due to the compressive forces being accommodated partly by the hydraulic system of the ram. As a result, the plate or metal section tends to lift off the supporting table, leading to distortion or deformation of an otherwise true shear or cut edge.

An object of the present invention is to provide a clamping device for holding metal plates or sections in position on a shearing machine during cutting or shearing operations in which the disadvantages set out above are minimized.

According to the present invention a clamping device adapted for use in maintaining metal plates, sections and the like in position on a supporting member of a shearing machine includes a cam having a bearing face, the cam being pivotally mounted in fixed spaced relationship relative to the supporting table of the machine and a hydraulic ram operable on the cam to urge the cam bearing face towards the supporting table.

Further features of the invention provide for the cam to be pivotally mounted to the frame of the shearing machine, for the ram to be pivotally mounted to the cam, for the cam to be mounted to the frame so that loading applied to the cam face will be transferred in greater proportion to the shearing machine frame than to the hydraulic system and for a plurality of rams to be provided which are operated through a single hydraulic system.

A preferred embodiment of the invention will now be described with reference to the accompanying drawing which is a diagrammatic representation of the clamping device in position on a shearing machine.

The clamping device comprises a cam 1 which is provided with two spaced axle holes 2, 3 each of which is fitted with a bushing. Through hole 2 a bolt 4 is passed which is then secured to the frame 5 of a shearing machine.

A bolt 6 is passed through the bushing provided in the hole 3 prior to being secured to the operative end 7 of the hydraulic ram 8. The cam face 11 may be serrated or roughed to enhance its grip on a metal plate to be severed by the machine.

The cylinder end 9 of the hydraulic ram 8 is mounted for pivotal movement to the bracket 10 carried by frame 5.

Operation of the hydraulic ram 8 therefore causes the cam 1 to pivot about bolt 4 as a result of which bearing surface 11 is moved towards the supporting table 12 of the shearing machine.

From the accompanying drawing it will be noted that the cam is so mounted that the major portion of the load applied by the plate 15 to the cam face acts upwards through bolt 4 while very little of this load is transferred to the hydraulic ram. In other words, most of the load applied to the cam face acts through the frame of the shearing machine.

Particularly where large plates are to be cut by the shearing machine a plurality of clamping devices are provided, the clamping devices being spaced along the length of cutting blades 13 and 14.

In operation, a metal plate 15 is positioned on the shearing machine's supporting table 12 and the hydraulic rams 8 are then operated to cause the cam bearing face 11 to be moved into firm abutment against the plate. In doing so, the plate is firmly clamped against the supporting table.

By suitable choice of cam effect and the distance separating the two axle holes of the cam, the extent by which the cam bearing face moves relative to the supporting surface can be made a fraction of the amount the piston moves at the same time. The cam thus serves to reduce the effective movement of the piston. At the same time, by suitable mounting of the cam, a reduced load is applied to the hydraulic ram. In this manner the use of the cam between the hydraulic ram and the plate serves to minimize the effect of the hydraulic system taking up the increased load imposed on it during operation of the shearing machine.

What I claim as new and desire to secure by Letters Patent is:

1. A clamping device for maintaining material in position in a shearing machine comprising: a supporting table, a cam having a bearing face, the cam being pivotally mounted to the frame of the shearing machine in fixed spaced relationship relative to the supporting table of the machine and a hydraulic ram operable on the cam to urge the cam bearing face towards the supporting table.

2. A clamping device as claimed in claim 1 in which the ram is pivotally mounted to the cam.

3. A clamping device as claimed in claim 2 in which the cam is mounted to the frame to allow loading to be transferred in greater proportion to the shearing machine frame than to the ram.

4. A clamping device as claimed in claim 3 in which a plurality of ram and cam arrangements are provided and operated through a single hydraulic supply system.

5. A clamping device for maintaining material in position in a shearing machine having a supporting table with a cutting edge and a cutting blade outwardly of said cutting edge and movable normally thereto comprising:
   a. a cam having a bearing face, said cam being pivotally mounted to the frame of the machine in fixed spaced relationship from said table;
   b. a hydraulic ram operable on the cam to pivot the cam bearing face toward the table;
   c. said cam and ram being mounted adjacent to and inwardly of said cutting edge so as to clamp material next to the cutting edge while permitting unobstructed movement of the cutting blade.

* * * * *